United States Patent Office 3,194,259
Patented July 13, 1965

3,194,259
GATE VALVES HAVING REMOVABLE
SLIDE AND SEAT UNIT
Ernest Reginald Garrod, Aldeburgh, England, assignor of one-half to Triangle Valve Company Limited, London, England
Filed Dec. 5, 1960, Ser. No. 73,844
Claims priority, application Great Britain, Dec. 4, 1959, 41,305/59
3 Claims. (Cl. 137—454.2)

This invention relates to valves used for controlling the flow of fluids through conduits such as oil pipelines, for example, and is concerned more particularly with valves designed to cause a minimum pressure-drop in the fluid and to present as little obstruction as possible to pipe scrapers or like means employed to remove deposits from the inner walls of the conduit.

It is an object of the present invention provide a valve of the character set forth in the preceding paragraph which will permit the removal of the moving components of the valve body for servicing purposes without necessitating the removal from the conduit of the entire valve body, which, in the case of an oil pipeline would often be welded in position.

When a valve is used in a conduit carrying crude oil, a nuisance is often caused by foreign matter, such as wax or sand, tending to settle inside the body of the valve which in conventional valves by virtue of its shape tends to permit setting of the foreign matter at points where free movement of the internal mechanism is obstructed. It is therefore a further object of the invention to provide a valve in which few spaces are provided in which foreign matter can settle.

The present invention consists in a valve comprising a valve body having a bore therethrough and a passage intersecting and crossing the bore, in which passage is mounted a removable valve unit comprising a slide slidable between and in contact with two spaced plates each formed with a hole disposed in communication with the bore of the body. Preferably, the holes in the plates and the aperture in the slide are so that the slide can be moved to a valve-open position in which an unobstructed bore of constant cross-section extends completely through the valve.

The invention further consists in a valve unit for a valve as set forth in the preceding paragraph, comprising a slide slidable between and in contact with two spaced plates each having a hole formed therein, the unit being removably mountable in the passage in the valve body so that the holes in the plates are disposed in communication, preferably co-axially, with the bore of the body.

Figure 1:
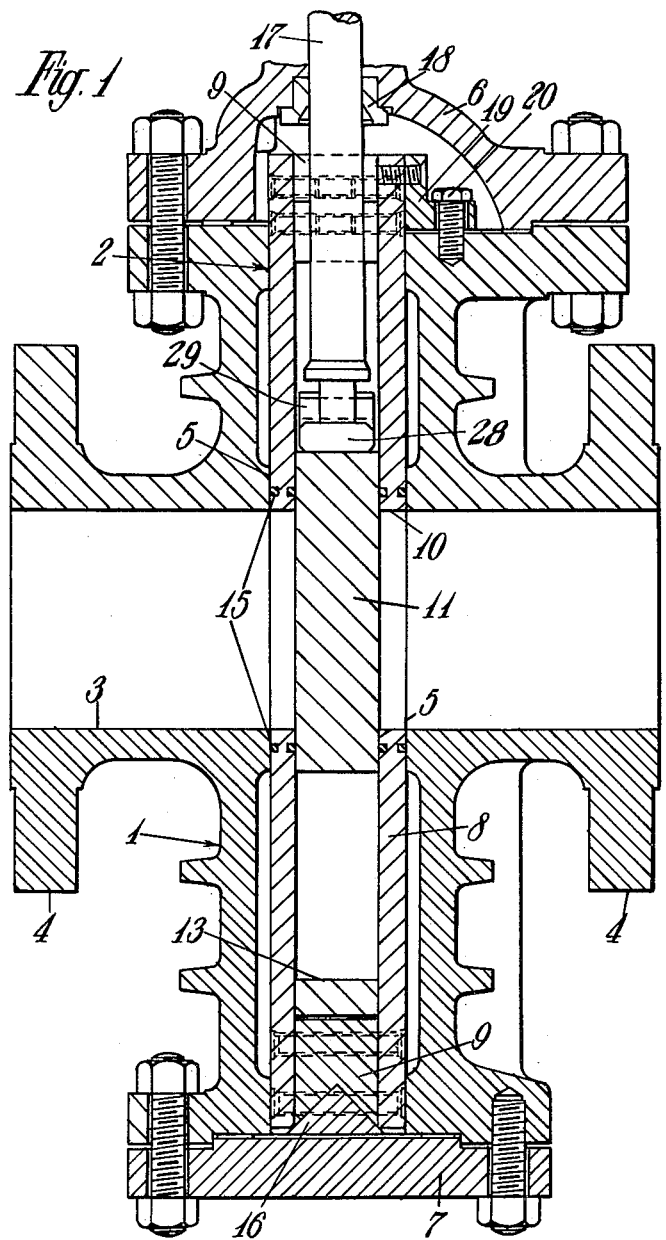
Figure 2:
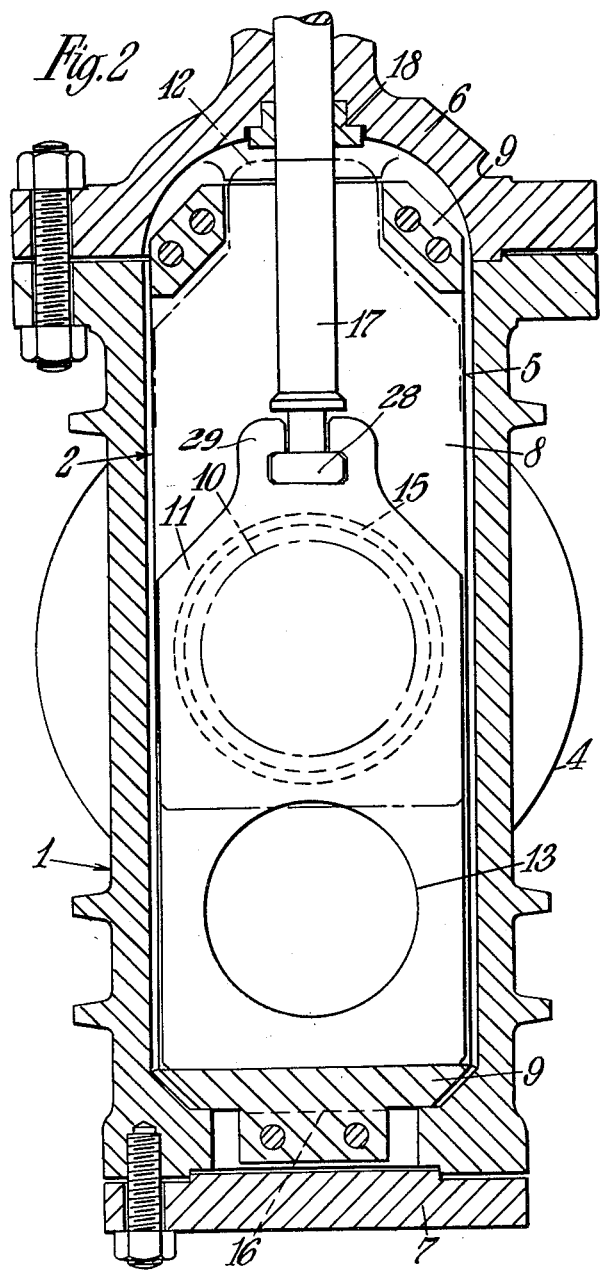
Figure 3:
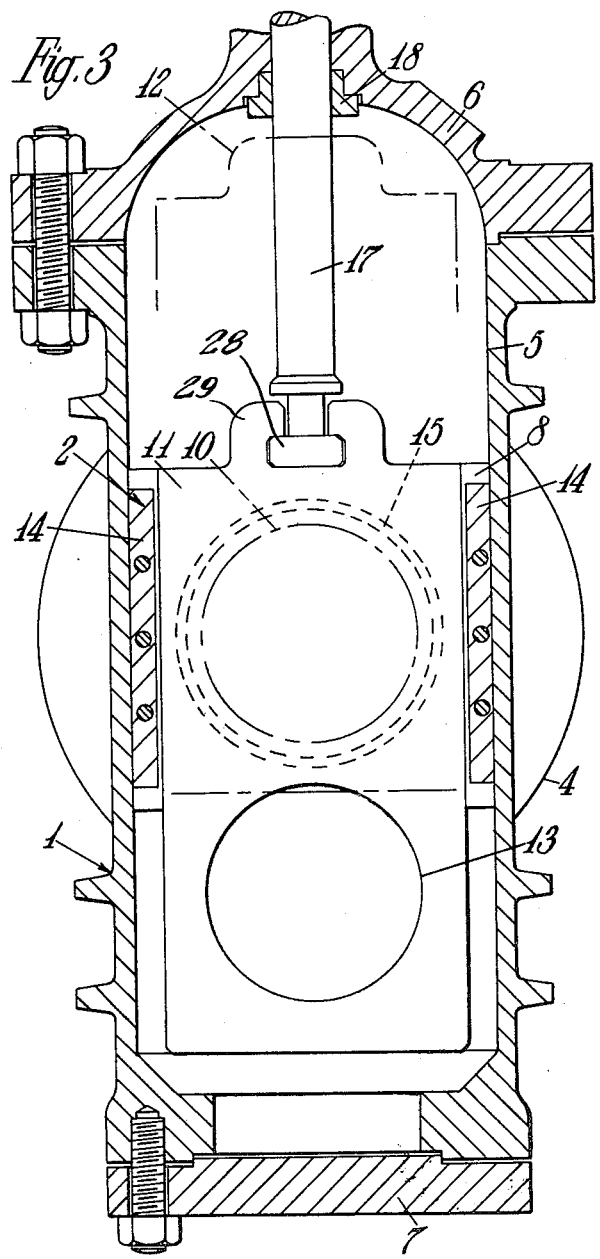

In the accompanying drawings:
FIGURE 1 is a vertical longitudinal section of a valve according to the present invention,
FIGURE 2 is a vertical cross-section of the valve shown in FIGURE 1,
FIGURE 3 is a view, similar to FIGURE 2, of an alternative form of valve according ot the present invention, and
FIGURES 4 to 10 show various forms of sealing means which may be employed in the valve according to the present invention.

In carrying the invention into effect according to one convenient mode by way of example, a valve for an oil pipeline consists of a valve body 1 into which is fitted a removable vale unit 2.

The valve body 1 has a bore 3 passing through it, which bore 3 is provided at each end with flanges 4 by means of which the body may be secured in conventional manner by welding or by bolts to suitable input and output pipes (not shown).

A passage 5 of rectangular cross-section is provided passing vertically downwards through the valve body 1 so as to intersect and cross the bore 3 at right angles, the passage 5 being provided with top and bottom cover plates 6 and 7 and being dimensioned so as to receive a valve unit 2 as a sliding fit and provide a seating for it in the valve body 1.

The removable valve unit 2 consists of two fixed plates 8 secured in spaced apart relationship by means of spacing pieces 9 located at the top and the bottom, such that the outside faces of the two fixed plates 8 fit very closely to the opposed seating surfaces of the unit-accommodating passage 5.

The two fixed plates 8 are provided with circular holes 10 disposed co-axially with each other and arranged such that when the unit is in position in the valve body 1, the holes are also disposed co-axially with the bore 3 of the valve body 1.

Between the two fixed plates 8, a slide 11 is mounted for sliding movement between a raised, valve-open position (shown in phantom in FIGURES 2 and 3, as 12), whereat a circular hole 13 in the slide 11 is positioned co-axially with the holes 10 in the fixed plates 8 and the bore 3 of the valve body 1 to permit the flow of fluid through the valve, and a lowered, valve-closed position, as shown in the figures, whereat the slide 11 completely blocks the bore 3 of the valve body 1 and prevents fluid-flow through the valve. The slide 11 is a tight fit between the two fixed plates 8, and the holes in the plates 8 and the slide 11 and the bore 3 of the conduit are all of the same diameter.

In a further modified form of the invention as shown in FIGURE 3, the length of the unit 2, from top to bottom is much reduced, and the spacing pieces 9 at the top and bottom are replaced by spacing strips 14 located along each side of the unit between the plates 8.

Sealing means are provided to reduce to a minimum the possibility of fluid seeping between the slide 11 and each fixed plate 8, and between each fixed plate 8 and the adjacent portions of the valve body 2.

Conveniently, the sealing means may consist, as shown, of soft resilient seal rings 15 for example, of polytetrafluoroethylene, Viton, or synthetic rubber, the rings encircling the holes 10 in the plates 8. The rings 15 are let into suitable grooved surfaces of the fixed plates. Preferably, as shown, no seals are provided on the valve body 1 itself so that when the valve unit 2 is withdrawn from the valve body 1 all the seals 15 are removed with it.

As shown in FIGURES 4 to 10, various forms of sealing means may be employed on the plate 8 which may also have annular inserts in the holes 10.

Figure 4:
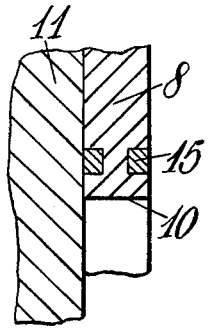
Figure 5:
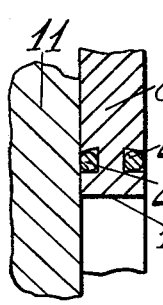

FIGURE 4 shows an enlarged view of the arrangement shown in FIGURE 1, with rings 15 fitted in the surfaces of the plate 8. FIGURE 5 shows a modified arrangement in which the sealing ring takes the form of an O ring 21 fitted in a groove 22 inwardly tapered toward the surface of the plate 8.

Figure 6:
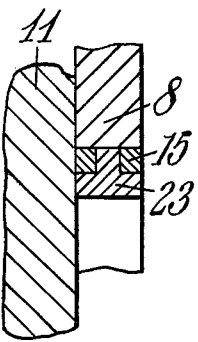
Figure 7:
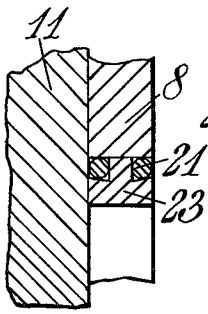

FIGURES 6 and 7 show modified forms of FIGURES 4 and 5, in which the seal ring 15 or O ring 21 is located not in the surface of the plate 8 but in a groove defined between the plate 8 and an annular metal insert 23 generally T-shaped in radial section and fitted in the hole in the plate 8.

Figure 8:
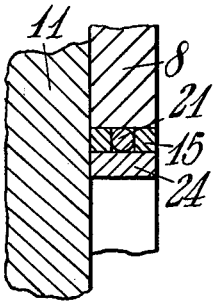

FIGURE 8 shows a further modified form in which an O ring 21 is fitted between the seat rings 15 and between the plate 8 and an annular metal insert 24 of rectangular radial section.

Figure 9:
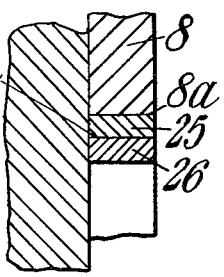

FIGURE 9 shows a still further modified form in which an annular seal ring 25 of a width equal to that of the plate 8, is fitted between the plate 8 and an annular metal insert 26, peripheral edges of the ring 25 being chamfered to engage ridge 8a and 26a on the plate 8 and insert 26 respectively.

Figure 10:
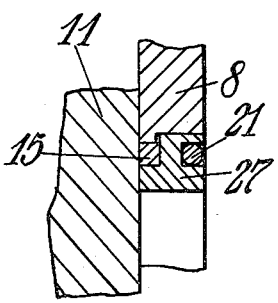

FIGURE 10 shows yet another modified form in which an annular metal insert 27 generally L-shaped in radial section is fitted in the hole 10 in the plate 8. In one end face of this insert 27 is fitted a resilient O ring 21, and in the groove defined between the other end of the insert 27 and the hole 10 in the plate 8 is fitted a seal ring 15. The hole 10 in the plate 8 is of two different diameters, the difference providing a "step" in radial section whereby lateral movement of the metal insert 27 is controlled to an extent to provide a sealing effect on the ring 15, and also to prevent undue tilt when portions of the rings 27 and 15 are exposed by the aperture 13 in the slide 11.

The removable top 6 and bottom 7 covers are arranged to locate the valve unit 2 in correct position in the valve body 1 and the bottom cover 7 carries a bar 16 of triangular cross-section which mates with a groove in the bottom of the lower spacing member 9. A shaft 17, releasably connected to the slide 11 by means of an enlargement 28 at the end of the shaft 17 which co-operates with a recess defined by portions 29 of the slide 11, passes through the gland 18 in the top cover 6 to a threaded portion (not shown) co-operating with a nut such that rotation of the shaft 17 causes raising or lowering of the slide 11 in conventional manner.

Alternatively or additionally, as shown in FIGURE 1, the valve unit 2 may be held in position by means of small brackets 19 and set-screws 20.

It will be appreciated that with the valve described, the valve unit may be removed quickly for repair or servicing, or replaced if necessary, leaving the valve body in situ, and that when the valve is in its fully open position practically no cavities are presented to the fluid in which wax or other foreign matters can settle.

It will also be appreciated that in the arrangements where an apertured slide 11 is provided, any foreign matter trapped in the aperture 13 between the plates 8 as and when the valve is closed, is retained in this aperture 13 until such time as the valve is next open when the foreign matter will be carried away by fluid flow through the valve.

Various modifications may be made within the scope of the present invention.

I claim:

1. A valve comprising a body having a flowway therethrough and a cavity therein intersecting and crossing the flowway, a removable valve cover closing one end of said cavity, an operating member passing through said cover, a pair of plate members located in said cavity and each having a hole disposed in communication with said flowway, means rigidly securing the two plate members together in fixed spaced relationship, a slide mounted between said plate members for sliding movement in close sealing contact with said plate members for opening and closing the flowway, releasable cooperating means on said slide and operating member whereby the slide may be moved for opening and closing the flowway by means of the operating member, and seal ring means in the surfaces of the plate members in contact with the slide and with the valve body.

2. A valve comprising a body having a flowway therethrough and a cavity therein intersecting and crossing the flowway, a removable valve cover closing one end of said cavity, an operating member passing through said cover, a pair of plate members located in said cavity and each having a hole disposed in communication with said flowway, means rigidly securing the two plate members together in fixed spaced relationship, a slide mounted between said plate members for sliding movement in close sealing contact with said plate members for opening and closing the flowway, releasable co-operating means on said slide and operating member whereby the slide may be moved for opening and closing the flowway by means of the operating member, and an annular metal insert in the hole in each plate member.

3. A valve comprising a body having a flowway therethrough and a cavity therein intersecting and crossing the flowway, a removable valve cover closing one end of said cavity, an operating member passing through said cover, a pair of plate members located in said cavity and each having a hole disposed in communication with said flowway, means rigidly securing the two plate members together in fixed spaced relationship, a slide mounted between said plate members for sliding movement in close sealing contact with said plate members for opening and closing the flowway, releasable cooperating means on said slide and operating member whereby the slide may be moved for opening and closing the flowway by means of the operating member, an annular metal insert in the hole in each plate member, and sealing ring means on each plate member located in the annular metal insert on one side of the member and between the insert and the plate member on the other side.

References Cited by the Examiner
UNITED STATES PATENTS

| | | | |
|---|---|---|---|
| 2,344,747 | 3/44 | Sperry | 137—315 |
| 2,651,320 | 9/53 | Hirsch | 251—327 XR |
| 2,705,019 | 3/55 | Volpin | 251—328 XR |
| 2,977,976 | 4/61 | Allen | 251—328 XR |
| 2,977,977 | 4/61 | Pennington | 251—328 XR |
| 2,986,367 | 5/61 | Lerouax | 251—327 XR |
| 3,061,267 | 10/62 | Hamer | 251—317 XR |

ISADOR WEIL, *Primary Examiner.*

M. CARY NELSON, *Examiner.*